United States Patent
Bombacino et al.

(10) Patent No.: US 8,564,835 B2
(45) Date of Patent: *Oct. 22, 2013

(54) COLOR DOCUMENT PRINTING SYSTEM FOR SELECTING A COMBINATION OF COLORS BASED ON CONTRAST AND COST

(75) Inventors: Vinicio Bombacino, Rome (IT); Leonardo Lanni, Rome (IT); Luigi Massa, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,030

(22) Filed: Apr. 10, 2012

(65) Prior Publication Data
US 2012/0200869 A1 Aug. 9, 2012

Related U.S. Application Data

(63) Continuation of application No. 12/984,953, filed on Jan. 5, 2011.

(51) Int. Cl.
*G06F 15/00* (2006.01)

(52) U.S. Cl.
USPC ............ 358/1.9; 358/518; 358/530; 358/2.1; 358/500; 715/961; 715/974; 345/591; 345/593; 345/617; 345/594

(58) Field of Classification Search
None
See application file for complete search history.

(56) References Cited

U.S. PATENT DOCUMENTS

| | | | | |
|---|---|---|---|---|
| 4,794,382 A | * | 12/1988 | Lai et al. | 345/594 |
| 5,311,212 A | * | 5/1994 | Beretta | 345/591 |
| 6,991,319 B2 | * | 1/2006 | Zerza et al. | 347/43 |
| 7,136,192 B2 | * | 11/2006 | Hussie | 358/1.9 |
| 7,433,492 B2 | | 10/2008 | Nambudiri et al. | |
| 7,580,781 B2 | | 8/2009 | Mindeman | |
| 2007/0070454 A1 | * | 3/2007 | Ernst et al. | 358/504 |
| 2009/0109454 A1 | | 4/2009 | Nagarajan et al. | |
| 2010/0128287 A1 | | 5/2010 | Harris et al. | |
| 2012/0170062 A1 | | 7/2012 | Bombacino et al. | |

FOREIGN PATENT DOCUMENTS

| | | |
|---|---|---|
| EP | 1622088 A2 | 2/2006 |
| JP | 2004066689 A | 3/2004 |
| JP | 2005007852 A | 1/2005 |
| JP | 2006231624 A | 9/2006 |
| JP | 2009083460 A | 4/2009 |

OTHER PUBLICATIONS

W. De Corte, W., Finding Appropriate Colors for Color Displays, Color Research and Application, vol. 11, No. 1, 1986, pp. 56-61.*

(Continued)

*Primary Examiner* — Paul F Payer
(74) *Attorney, Agent, or Firm* — Yee & Associates, P.C.; Jeffrey S. LaBaw

(57) ABSTRACT

The different illustrative embodiments provide a method and apparatus for managing a set of colors in a document. A plurality of respective costs are identified. Each respective cost is associated with printing the document using a respective combination of a plurality of combinations of the set of colors. An amount of contrast for a first respective combination is identified using a contrast matrix. A determination is made as to whether the amount of contrast for the first respective combination and an associated respective cost meet a set of criteria. Responsive to a determination that the set of criteria is met, the document is printed using the first respective combination.

10 Claims, 7 Drawing Sheets

(56) References Cited

OTHER PUBLICATIONS

Laksin et al., "Electon Beam Curable Flexographic Printing Inks for Flexible Packaging," Pitture E. Vernice, Europe, 80(11):41-45, 2004.
Shu, "Error Diffusion with Ink Reduction for High Quality and High Resolution Ink Jet Printing," 1995 IEEE International Conference on Image Processing, Washington, DC, Oct. 23-26, 1995, pp. 121-124.
Bombacino et al., U.S. Appl. No. 12/984,953, filed May 4, 2011, 38 pages.
USPTO Non-Final Office Action for U.S. Appl. No. 12/984,953, Oct. 16, 2012, 18 pages.
USPTO Final Office Action for U.S. Appl. No. 12/984,953, Jan. 31, 2013, 22 pages.
USPTO Notice of Allowance for U.S. Appl. No. 12/984,953, filed Apr. 17, 2013, 9 pages.

* cited by examiner

600

| COLORS | TOTAL COST |
|--------|------------|
| ... | ... |
| ... | ... |
| E, D, B | 6 |
| E, D, F | 6 |
| E, B, F | 7 |
| A, D, E | 7 |

| M | A | B | C | D | E | F |
|---|---|---|---|---|---|---|
| A | 0.0 | | | | | |
| B | 0.2 | 0.0 | | | | |
| C | 0.7 | 0.4 | 0.0 | | | |
| D | 0.5 | 0.2 | 0.5 | 0.0 | | |
| E | 0.5 | 0.3 | 0.8 | 0.2 | 0.0 | |
| F | 0.1 | 0.6 | 0.5 | 0.4 | 0.2 | 0.0 |

FIG. 7

COLOR DOCUMENT PRINTING SYSTEM FOR SELECTING A COMBINATION OF COLORS BASED ON CONTRAST AND COST

This application is a continuation of application Ser. No. 12/984,953, filed Jan. 5, 2011, status pending.

BACKGROUND

1. Field

The disclosure relates generally to managing documents and more specifically to an improved data processing system for managing documents. Even more specifically, the disclosure relates to a method, computer program product, and apparatus for managing a set of colors in a document.

2. Description of the Related Art

Documents are commonly printed on paper by a printer. The printer is frequently controlled by a data processing system. The data processing system transmits data to the printer that contains information about the images and colors for printing a document. Documents may be printed in a single color or multiple colors. A single color is black, for example. An example of a document containing multiple colors may contain a red image and a green image.

Documents are frequently printed in multiple colors in order to assist a reader in interpreting the document. For example, a line chart that indicates a series of data for each entity in a group may present a line on the chart for each of the entities. One example of a line chart is the number of sales over a period of time for a number of different items at a store. Data for each of the items are presented for the same period of time. Such a presentation allows a reader to compare the sales performance for the different items over the period of time.

When printing the line chart on paper, a different color may be used for each line on the line chart. Different colors may be used so the reader is able to visually understand the different lines on the chart. In the event that a single color is used in some documents, the reader may become confused or unable to interpret the information presented.

Printers frequently use a set of colored inks to generate lines, images, text, and other information on printed documents. The printer may only have a small number of colored inks. For example, the printer may contain a cyan ink, a magenta ink, a yellow ink, and a black ink. In the event the printer receives a document containing an area to be printed in cyan, the cyan ink is used to print the area.

A printer with a set of colored inks may also print colors that are not among the set of colored inks by combining the colored inks in different quantities. For example, a printer may print an olive green area by mixing about 37 percent cyan, 0 percent magenta, 54 percent yellow, and 63 percent black. In these illustrative examples, each percentage for a colored ink represents the amount of the colored ink used in the combination relative to the amount of colored ink that may be used in the area being printed. For example, about 100 percent cyan represents that the most cyan colored ink that may be printed in the area is being used. Thus, each percentage represents the percentage of the color to be used. Of course, many other colors may be produced using the colored inks.

SUMMARY

The different illustrative embodiments provide a method and apparatus for managing a set of colors in a document. A plurality of respective costs are identified. Each respective cost is associated with printing the document using a respective combination of a plurality of combinations of the set of colors. An amount of contrast for a first respective combination is identified using a contrast matrix. A determination is made as to whether the amount of contrast for the first respective combination and an associated respective cost meet a set of criteria. Responsive to a determination that the set of criteria is met, the document is printed using the first respective combination.

BRIEF DESCRIPTION OF THE SEVERAL VIEWS OF THE DRAWINGS

FIG. 6 is an illustration of a table containing combinations of colors and costs for the combinations of colors in accordance with an illustrative embodiment;

FIG. 7 is an illustration of a contrast matrix in accordance with an illustrative embodiment;

DETAILED DESCRIPTION

Figure 1:
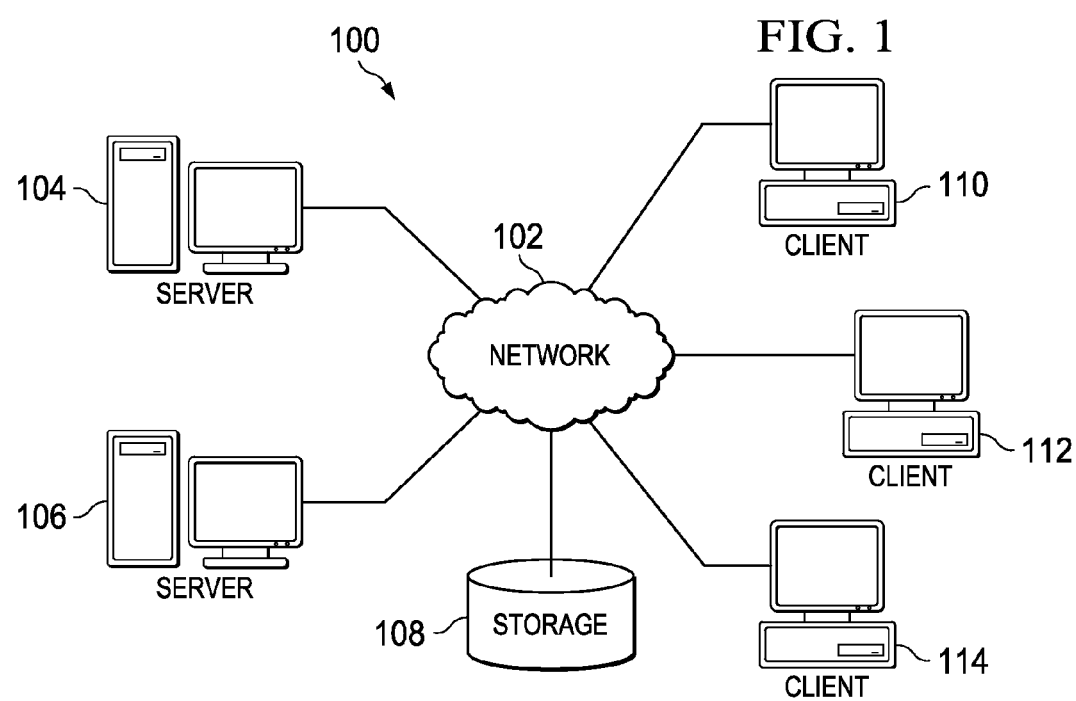
FIG. 1 is an illustrative diagram of a data processing environment in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown. In some illustrative embodiments, client computer 110 receives a document to be printed from server computer 104. In such an illustrative embodiment, a color management process running on client computer 110 processes the document to be printed prior to causing a printer connected to client computer 104 to print the document.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
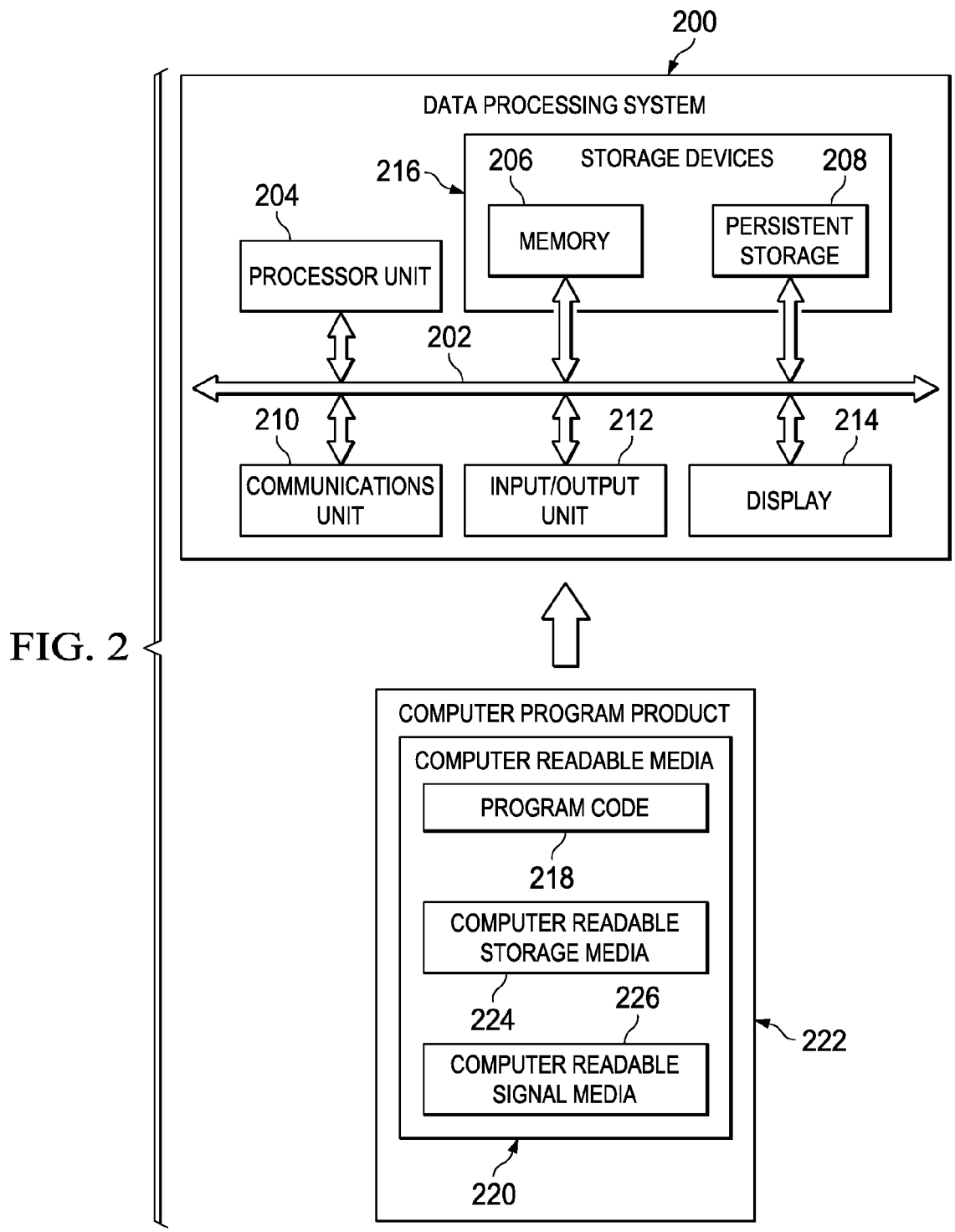
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 is an example of a data processing system that may be used to implement computers in network data processing system 100 in FIG. 1. For example, data processing system 200 may be used to implement server computer 104 and client computers 110 in FIG. 1

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media ×20 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these examples computer readable storage media 224 is a physical or tangible storage device used to store program code 218 rather a medium that propagates or transmits program code 218. Computer readable storage media 224 is also referred to as a computer readable tangible storage device or a computer readable physical storage device. In other words, computer readable storage media 224 is a media that can be touched by a person.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 404 may have a number of hardware units and a number of processors that are configured to run program code 218. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that to transmit, data, receive data, or transmit and receive data. A communications unit may be, for example, a modem or a network adapter, two network adapters, or some combination thereof. Further, a memory may be, for example, memory 206, or a cache, such as found in an interface and memory controller hub that may be present in communications fabric 202.

The different illustrative embodiments recognize and take into account a number of different considerations. For example, the illustrative embodiments recognize and take into account that each ink in the set of colored inks for a printer may be priced differently. A set as used herein with reference to items refers to one or more items. For example, a set of colored inks is one or more colored inks. Some inks may be more costly than other inks used by the same printer. A user printing the document may be unaware of the cost of the different inks when choosing the colors for the document. Thus, the illustrative embodiments recognize and take into account the user may use an expensive combination of colors without awareness of the cost. Additionally, the user may select a less expensive combination of colors.

The different illustrative embodiments recognize and take into account that the cost of printing a document using different combinations of colors may differ based on the cost of the ink or the amount of ink used. The cost may be expressed in terms of amount of ink used or in terms of dollars of ink spent. A user choosing colors for the document may be unaware of the cost of using different colors. Additionally, the individual or entity providing the ink may place a higher priority on reducing the cost of ink than the user printing the document.

The different illustrative embodiments also recognize and take into account that one combination of colors has a different amount of contrast between the colors in the combination than another combination of colors. Contrast is the amount of visual difference between two or more colors. For example, the amount of contrast between gray and black is less than the contrast between red and green. In these illustrative examples, a combination of colors is identified for the document to be printed that reduces cost and maintains a minimum amount of contrast between the colors.

The different illustrative embodiments also recognize and take into account that readers of a document may not be able to interpret data in the document when the amount of contrast between two colors in the document is below a minimum amount of contrast. For example, a line chart with two lines in which one line is printed in gray and one line is printed in light gray may produce a document that a viewer is unable to understand because the light gray line appears visually similar to the dark gray line.

Thus, the different illustrative embodiments provide a method, computer program product, and apparatus for managing a set of colors in a document. A plurality of respective costs are identified. Each respective cost is associated with printing the document using a respective combination of a plurality of combinations of the set of colors. An amount of contrast for a first respective combination is identified using a contrast matrix. A determination is made as to whether the amount of contrast for the first respective combination and an associated respective cost meet a set of criteria. Responsive to a determination that the set of criteria is met, the document is printed using the first respective combination.

Figure 3:
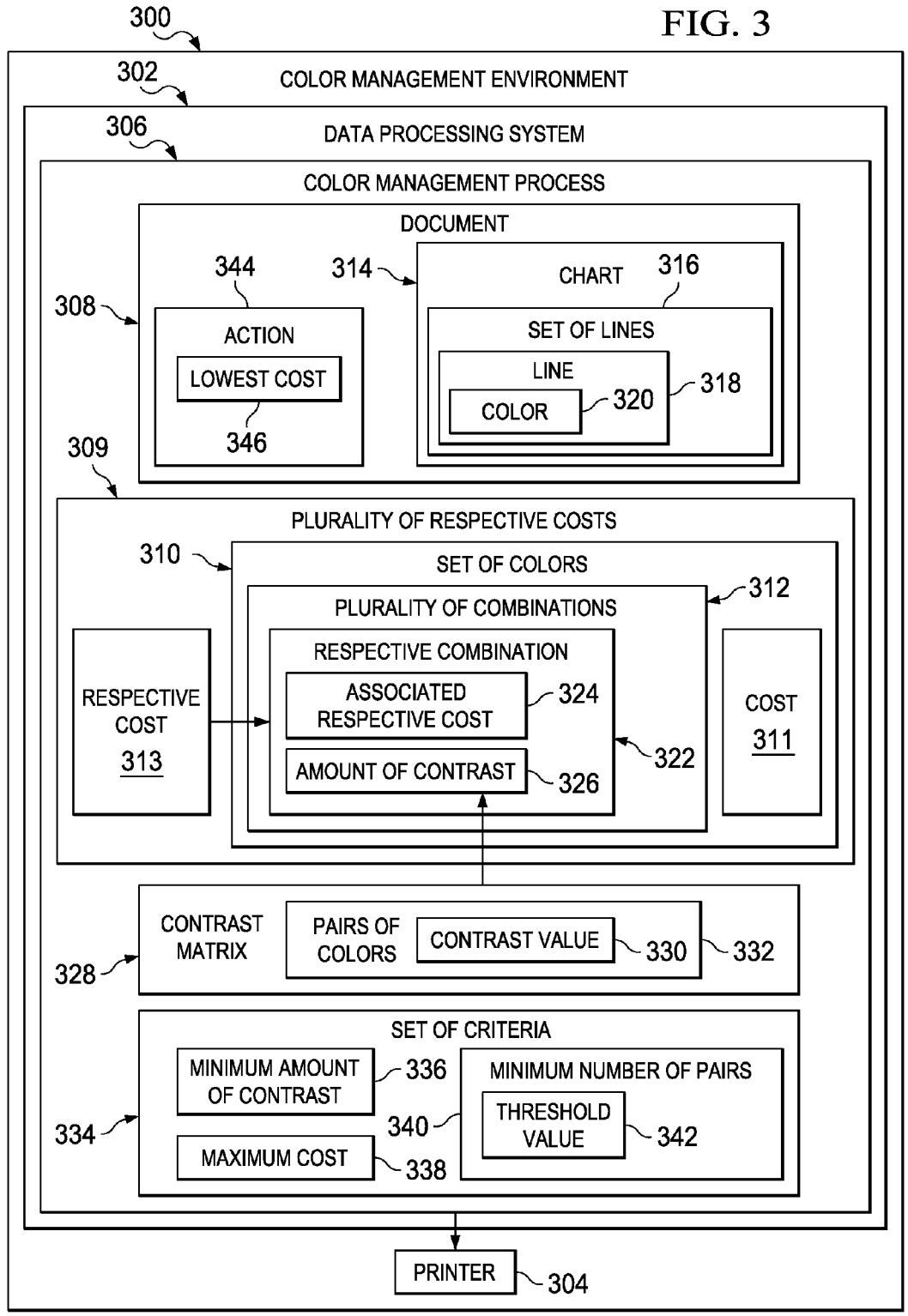
FIG. 3 is an illustration of a block diagram of a color management environment in accordance with an illustrative embodiment.

Turning now to FIG. 3, an illustration of a block diagram of a color management environment in accordance with an illustrative embodiment. Color management environment 300 is an example of an environment in which illustrative embodiments may be implemented.

In these examples, color management environment 300 contains data processing system 302 and printer 304. Data processing system 302 is an example implementation of data processing system 200 in FIG. 2. Data processing system 302 runs color management process 306. Color management process 306 receives document 308 from another process running on data processing system 302. Alternatively, document 308 may be received from another data processing system, color management process 306, or another suitable source. Document 308 is a collection of images, text, and/or other data that is to be printed by data processing system 302 on printer 304. For example, a user may have selected to print document 308 using a word processor process running on data processing system 302.

In the illustrative examples, document 308 is chart 314. Chart 314 is a graphical representation of data. Chart 314 includes set of lines 316. Set of lines 316 includes one or more lines that are to be printed using colors in set of colors 310. For example, line 318 in chart 314 is to be printed in color 320. Color 320 is a color in set of colors 310. For example, color 320 may be navy blue.

Once document 308 is received by color management process 306, color management process 306 identifies set of colors 310. Set of colors 310 is the collection of colors that printer 304 may print. In other words, set of colors 310 contains plurality of combinations 312. Plurality of combinations 312 are the colors that may be produced by combining the colored inks of printer 304 in particular quantities. For example, assume that set of colors 310 includes cyan, magenta, yellow, and black. Printer 304 may print an olive green area by mixing about 37 percent cyan, about 0 percent magenta, about 54 percent yellow, and about 63 percent black. Of course, plurality of combinations 312 also includes the colors that use only a single colored ink in printer 304. For example, plurality of combinations 312 may also include about 100 percent cyan, about 0 percent magenta, about 0 percent yellow, and about 0 percent black. Color management process 306 may identify set of colors 310 when printer 304 is installed on data processing system 302, each time document 308 is received, according to a user-specified schedule or another suitable time.

Color management process 306 identifies plurality of respective costs 309. Plurality of respective costs 309 is a collection of costs associated with printing document 308 using each of plurality of combinations 312. Respective cost 313 is a cost within plurality of respective costs 309. Each respective cost 313 in plurality of respective costs 309 represents the cost of printing document 308 using a combination of colors in plurality of combinations 312.

In these illustrative examples, plurality of combinations 312 contains respective combination 322. Respective combination 322 is a combination of colors in set of colors 310 that may be used to print document 308. Color management process 306 identifies associated respective cost 324 of respective combination 322. Associated respective cost 324 is the amount of money, amount of ink, or another suitable type of value used to produce respective combination 322. In these illustrative examples, color management process 306 identifies associated respective cost 324 of respective combination 322 by adding cost 311 for each color in set of colors 310.

Associated respective cost 324 is respective cost 313 for respective combination 322. In other words, associated respective cost 324 is the cost of printing document 308 using respective combination 322 of set of colors 310. Associated respective cost 324 is identified for producing the amount of respective combination 322 that would be used to replace a color in document 308. For example, in illustrative embodiments in which document 308 is chart 314, associated respective cost 324 is identified for producing the amount of respective combination 322 to replace color 320 of line 318.

Color management process 306 also identifies amount of contrast 326 for each of plurality of combinations 312. Amount of contrast 326 is the amount of visual difference between the colors in plurality of combinations 312. Amount of contrast 326 is expressed numerically in these examples. In some illustrative embodiments, color management process 306 uses contrast matrix 328 to identify amount of contrast 326 for each respective combination 322.

Contrast matrix 328 is a data structure that includes contrast value 330 for the contrast between pairs of colors 332. In other words, contrast matrix 328 includes a numeric value representing the amount of contrast between the two colors represented by each axis. For example, contrast matrix 328 contains a series of numeric values that represent the amount of contrast between olive green and each other color in set of colors 310.

Figures 6, 7:
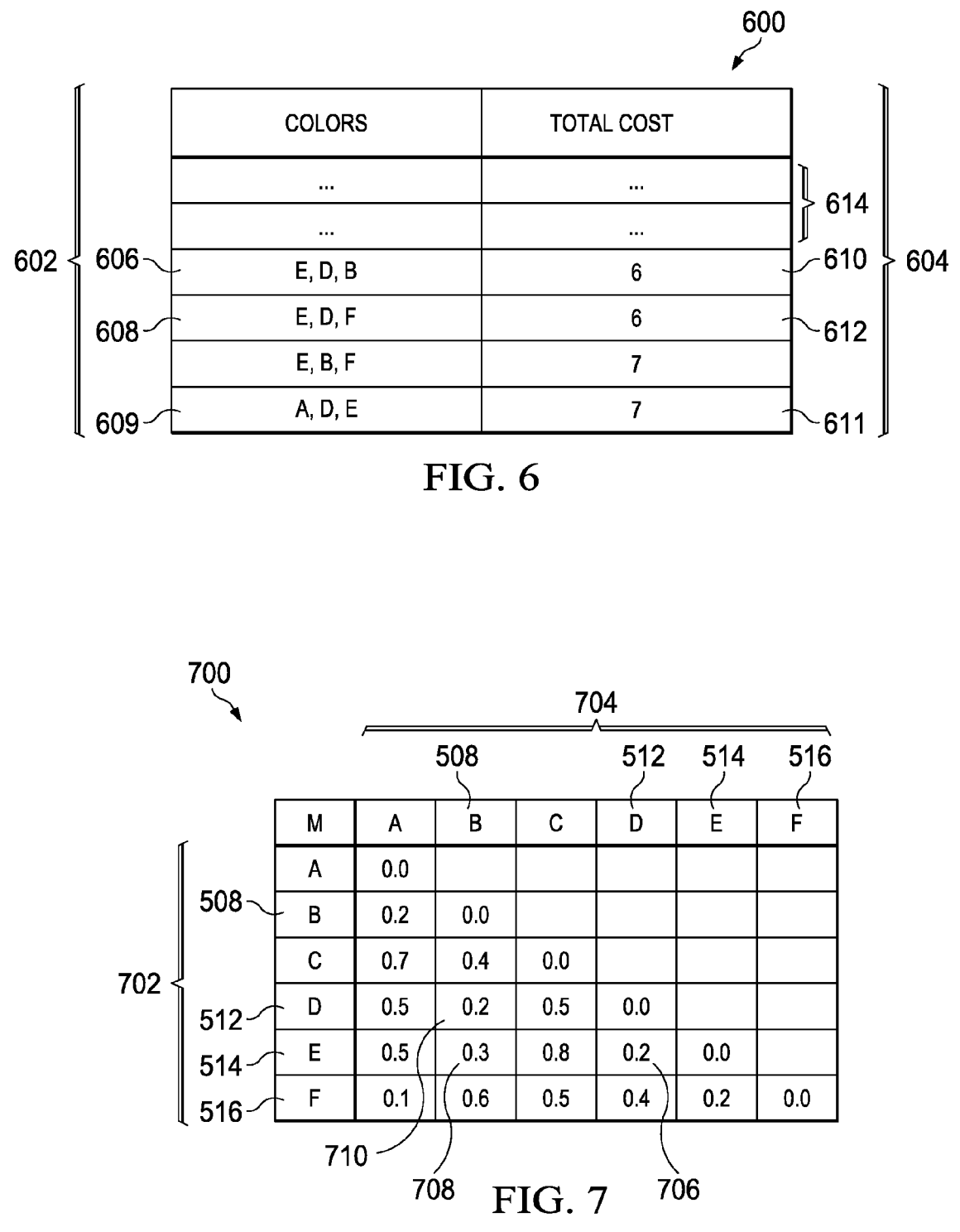

An example implementation of contrast matrix 328 is presented as a table contrast matrix 700 in FIG. 7. In these depicted examples, contrast matrix 328 is in the form of a table. In other examples, the contrast matrix 328 may take other forms, such as a flat file, a linked list, or some other suitable form.

Color management process 306 then uses contrast value 330 for pairs of colors 332 to identify amount of contrast 326 for each respective combination 322. In some illustrative embodiments, color management process 306 identifies amount of contrast 326 by adding contrast value 330 for each pair of colors in respective combination 322. In other illustrative embodiments, color management process 306 identifies amount of contrast 326 by averaging contrast value 330 for each pair of colors in respective combination 322. Of course, color management process 306 may use any other suitable calculation to identify amount of contrast 326 using contrast value 330 for each respective combination 322. In yet other illustrative embodiments, color management process 306 generates amount of contrast 326 using a formula or algorithm instead of contrast matrix 328.

Color management process 306 then determines whether associated respective cost 324 and amount of contrast 326 for each respective combination 322 in set of colors 310 meets set of criteria 334. Set of criteria 334 may include minimum amount of contrast 336, maximum cost 338, or any other suitable criteria. In other words, set of criteria 334 may indicate that only colors greater than or less than preselected values in one or both of contrast and cost may be selected for document 308. Of course, set of criteria 334 may include other or additional criteria. For example, set of criteria 334 may also include colors that take less than a particular amount of time to print or to dry on the document being printed or another suitable criterion.

In some illustrative embodiments, set of criteria 334 includes minimum number of pairs 340 having contrast value 330 that meets threshold value 342. Threshold value 342 is a value that represents a predetermined number of pairs that respective combination 322 is to meet in order to be a candidate for the replacement of colors in document 308. For example, set of criteria 334 may be satisfied when at least two pairs of colors 332 in respective combination 322 have contrast value 330 of at least about 0.4.

Once each respective combination 322 that meets set of criteria 334 is identified, color management process 306 performs action 344 on document 308. In some illustrative embodiments, action 344 includes replacing the colors in document 308 with the respective combination 322 having a highest or lowest value for a criterion in set of criteria 334. For example, five plurality of combinations 312 may have associated respective cost 324 that is below maximum cost 338 and amount of contrast 326 that is above contrast value 330. In these illustrative examples, color management process 306 replaces the colors in document 308 with the combination of the five combinations that has lowest cost 346. Lowest cost 346 is the cost associated with respective combination 322 that is less than the cost associated with the other combinations in plurality of combinations 312.

Alternatively, color management process 306 may replace the colors in document 308 with the combination of the five combinations that has the highest amount of contrast 326. For example, color management process 306 may replace the colors in document 308 with the combination of the five combinations that has the highest amount of contrast 326 because document 308 includes an image for which significant changes in color are undesirable.

In yet other illustrative embodiments, color management process 306 may replace the colors in document 308 with respective combination 322 having the most number of pairs that meet threshold value 342. In these examples, action 344 also includes printing the document using respective combination 322 that was selected to replace the colors in document 308. In illustrative embodiments in which document 308 is chart 314, each color 320 for set of lines 316 is replaced with a color in respective combination 322. Thus, the cost of ink used to print document 308 is reduced while amount of contrast 326 remains above a minimum amount. This minimum amount is an amount that allows a reader of document 308 to interpret document 308.

The illustration of data processing system 302 in color management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, minimum amount of contrast 336 may be set differently for different users. Since some users may have better ability to distinguish colors than other users, minimum amount of contrast 336 may vary based on the ability of the user to distinguish colors. A setting in a user account for the user may be used to identify the ability of the user to distinguish colors. Alternatively, the user may be presented with a color test in a user interface in order to identify the ability of the user to distinguish colors.

In other illustrative embodiments, set of colors 310 may not include all colors that printer 304 may print. In such illustrative embodiments, set of colors 310 may not include colors that include an ink cartridge in printer 304 that is empty or is running low. Thus, document 308 may still be printed in colors that are available to printer 304 at the time document 308 is printed.

FIGS. 4-8 present an example of color replacement. In this example, colors in chart 400 are replaced with colors that have lower cost to print but have a minimum amount of contrast between one another.

Figures 4, 5:
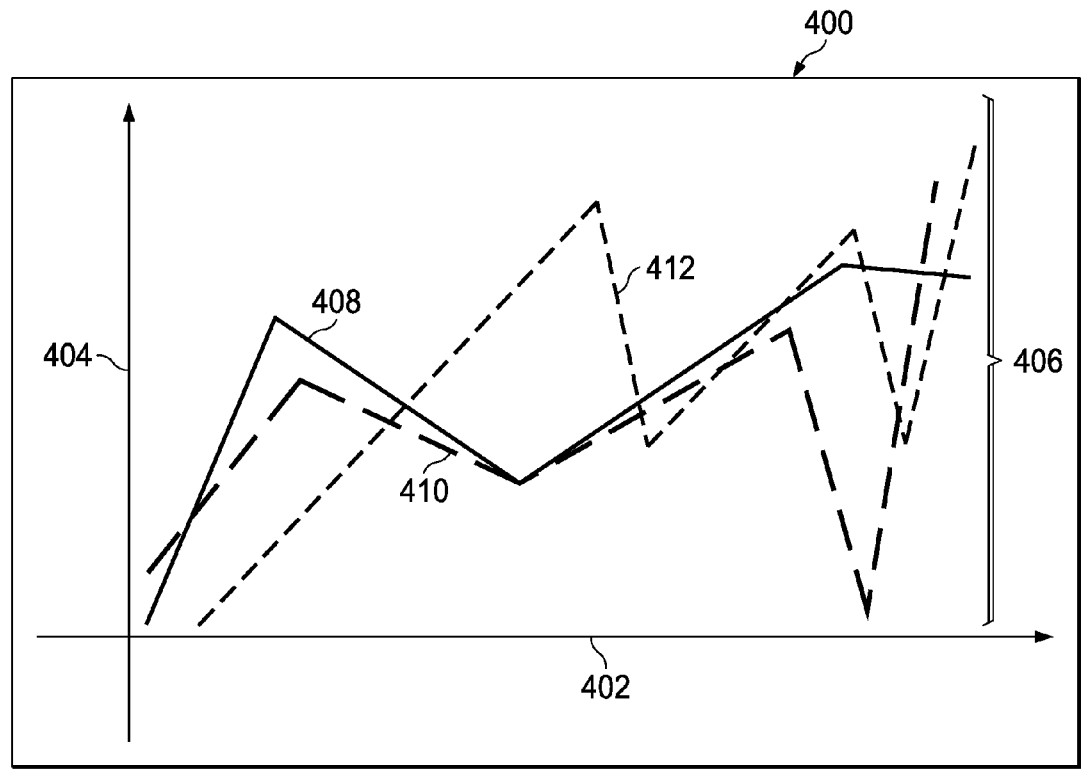
FIG. 4 is an illustration of a chart in accordance with an illustrative embodiment.
FIG. 5 is an illustration of a table containing a cost of a set of colors in accordance with an illustrative embodiment.

Turning now to FIG. 4, an illustration of a chart is depicted in accordance with an illustrative embodiment. Chart 400 is an example of one implementation of chart 314 in FIG. 3.

Chart 400 has axis 402 and axis 404. Chart 400 represents a document that is to be printed by a printer, such as printer 304 in FIG. 3. Chart 400 is also has set of lines 406. Set of lines 406 is an example implementation of set of lines 316 in FIG. 3. In this illustrative example, set of lines 406 contains line 408, line 410, and line 412. Line 408 is colored green, line 410 is colored blue, and line 412 is colored red. Thus, three colors are present in chart 400 and may be replaced with colors that are lower in cost but maintain at least a predetermined amount of contrast to one another.

Turning now to FIG. 5, an illustration of a table containing a cost of a set of colors is depicted in accordance with an illustrative embodiment. Table 500 contains set of colors 502 and cost column 504 for set of colors 502. Set of colors 502 is an example implementation of set of colors 310 in FIG. 3.

Table 500 has color 506, color 508, color 510, color 512, color 514, and color 516. Colors 506, 508, 510, 512, 514, and 516 are contained in set of colors 502. In other words, colors 506, 508, 510, 512, 514, and 516 are the colors that are printable by the printer printing chart 400 in FIG. 4.

In this illustrative embodiment, table 500 also has cost column 504. Cost column 504 identifies the cost for each of colors 506, 508, 510, 512, 514, and 516. Cost 518, cost 520, cost 522, cost 524, cost 526, and cost 528 are example implementations of cost 311 in FIG. 3. Cost 518, 520, 522, 524, 526, and 528 represent the cost to print the color represented by the row in which each of cost 518, 520, 522, 524, 526, and 528 is located. For example, cost 518 of 4 represents that 506 costs 4 units to print. The units may be dollars or units of ink, such as microliters. In this illustrative example, cost 520 is 3, cost 522 is 6, cost 524 is 2, cost 526 is 1, and cost 528 is 3.

With specificity to FIG. 6, an illustration of a table containing combinations of colors and costs for the combinations of colors is depicted in accordance with an illustrative embodiment. Table 600 contains combinations 602 and cost column 604. Each combination in combinations 602 is an example implementation of respective combination 322 in FIG. 3. For example, combination 606 contains colors 514, 512, and 508. Cost 610 represents the cost of printing the document using the combination of colors 514, 512, and 508. Likewise, combination 608 represents the combination of colors 514, 512, and 516. Cost 612 indicates that the cost to print the document using colors 514, 512, and 516 is also six units. Combination 609 represents the combination of colors 506, 512, and 514. Cost 611 indicates that the cost to print the document using colors 506, 512, and 514 is seven units.

Table 600 is depicted in part to demonstrate identifying a cost for printing the document using the combination. Section 614 indicates that additional entries are present in table 600 that are not depicted. In this illustrative embodiment, table 600 is sorted in increasing order of cost.

Turning now to FIG. 7, an illustration of a contrast matrix is depicted in accordance with an illustrative embodiment. Contrast matrix 700 is an example implementation of contrast matrix 328 in FIG. 3.

Contrast matrix 700 includes a table of values that indicate the amount of contrast between two colors. In this illustrative embodiment, contrast matrix 700 is presented as a table with six rows and six columns. Each row in rows 702 represents a color in set of colors 502. Likewise, each column in columns 704 represents a color in set of colors 502. For example, columns 702 and rows 704 include color 516.

For each combination in table 600, a contrast value is identified. In this illustrative embodiment, the contrast value for a combination is identified by adding the contrast value in contrast matrix 700 for each of the pairs of colors in the combination. For example, the contrast value of combination 606 is identified by adding contrast value 706, contrast value 708, and contrast value 710. Contrast value 706 is the amount of contrast between colors 512 and 514. Contrast value 708 is the amount of contrast between colors 508 and 514. Likewise, contrast value 710 is the amount of contrast between colors 508 and 512. Thus, the amount of contrast for combination 606 is identified by adding the contrast values for the pairs of colors ED, EB, and DB. Therefore, in this illustrative example, the amount of contrast for combination 606 is about 0.7. The amount of contrast for combination 606 of about 0.7 is depicted as amount of contrast 804 in FIG. 8.

Figures 8, 9:
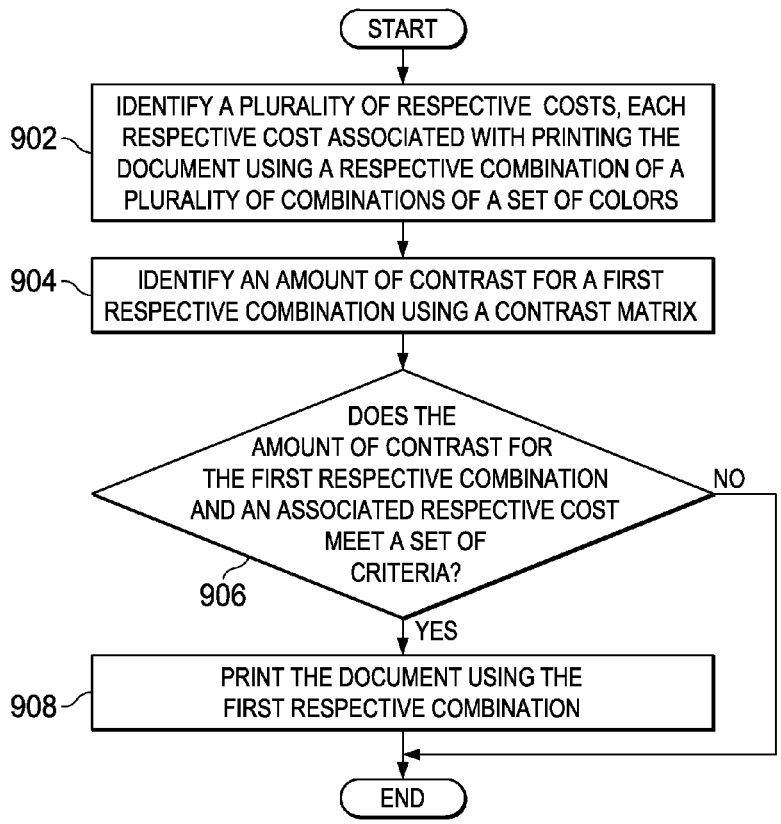
FIG. 8 is an example of a table including the amount of contrast for combinations of colors in accordance with an illustrative embodiment.
FIG. 9 is an illustration of a flowchart of a process for managing a set of colors in a document in accordance with an illustrative embodiment.

Looking now to FIG. 8, an example of a table including the amount of contrast for combinations of colors is depicted in accordance with an illustrative embodiment. Table 800 includes combinations 602. Table 800 also includes amount of contrast column 802. Amount of contrast column 802 contains an amount of contrast for each of combinations 602. The amount of contrast is an example implementation of amount of contrast amount of contrast 326 in FIG. 3.

In this illustrative example, amount of contrast 804 represents the amount of contrast for combination 606. The amount of contrast for combination 606 is identified by adding the contrast values for the pairs of colors ED, EB, and DB using contrast matrix 700. Likewise, amount of contrast 806 represents the amount of contrast for combination 608. Amount of contrast 806 is identified by adding contrast values in contrast matrix 700 for the pairs DE, DF, and EF.

Table 800 is depicted in part to demonstrate identifying an amount of contrast for combinations of colors. Section 808 indicates that additional entries are present in table 600 that are not depicted. In this illustrative embodiment, table 800 contains an amount of contrast for each combination in table 600.

Once amount of contrast column 802 is identified, a color management process selects a combination to use to print chart 400. The color management process, such as color management process 306 in FIG. 3, uses a set of criteria to select the combination to use to print chart 400. In some illustrative embodiments, the color management process selects the combination with the highest amount of contrast and having a cost less than seven units. In this illustrative example, combination 608 is selected because amount of contrast 806 of about 0.8 is the highest amount of contrast in table 800 for a combination with a cost less than seven units. Combination 608 has cost 612 of six units.

In other illustrative embodiments, the color management process selects the combination with the lowest cost for a minimum amount of contrast. For example, assume the criteria includes that the combination is to have the lowest cost and an amount of contrast greater than 0.6. In such an illustrative example, combination 606 is selected because combination 606 has amount of contrast 804 of about 0.7 and cost 610 of about six units. Of course, other criteria may be used in other illustrative embodiments. For example, the criteria may indicate that the combination to be selected is the combination having the most number of pairs with a contrast value, such as contrast value 708, of at least 0.3.

The color management process then replaces the colors in set of lines 406 with the colors in the combination selected using the set of criteria. In other words, in the event that combination 608 is selected, color 508 is replaced with color 514, color 510 is replaced with color 512, and color 512 is replaced with color 516. Chart 400 may then be printed using a printer, such as printer 304 in FIG. 3.

Turning now to FIG. 9, an illustration of a flowchart of a process for managing a set of colors in a document is depicted in accordance with an illustrative embodiment. The process may be performed by color management process 306 running on data processing system 302 in FIG. 3.

The process begins by identifying a plurality of respective costs, each respective cost associated with printing the document using a respective combination of a plurality of combinations of the set of colors (step 902). The cost may be associated respective cost 324, the document may be document 308, and the combination may be respective combination 322 in FIG. 3. The process then identifies an amount of contrast for a first respective combination using a contrast matrix (step 904). The amount of contrast may be amount of contrast 326 and the contrast matrix may be contrast matrix 328 in FIG. 3.

Next, the process determines whether the amount of contrast for the first respective combination and an associated respective cost meet a set of criteria (step 906). The set of criteria may be set of criteria 334 in FIG. 3. If at step 906 the process determines that the set of criteria is not met, the process terminates. If at step 906 the process determines that the set of criteria is met, the process prints the document using the first respective combination (step 908) and terminates thereafter. The action may be action 344 in FIG. 3.

Figure 10:
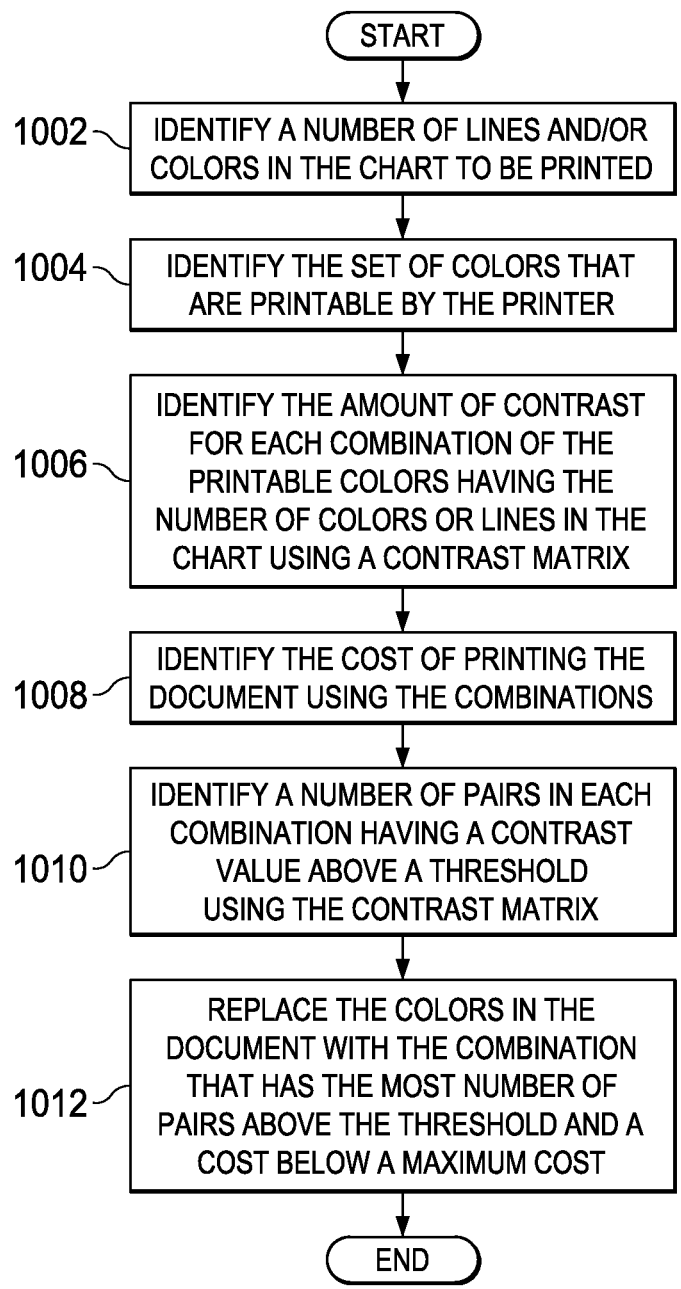
FIG. 10 is an illustration of a flowchart of a process for an illustration of a flowchart of a process for replacing colors in a document to be printed in accordance with an illustrative embodiment.

With specificity to FIG. 10, an illustration of a flowchart of a process for replacing colors in a document to be printed in accordance with an illustrative embodiment. The process may be performed by color management process 306 running on data processing system 302 in FIG. 3.

The process begins by identifying a number of lines and/or colors in the chart to be printed (step 1002). The number of lines may be set of lines 316, and colors may be color 320 in FIG. 3. Next, the process identifies the set of colors that are printable by the printer (step 1004). The printer may be printer 304 in FIG. 3.

Then, the process identifies the amount of contrast for each combination of the printable colors having the number of colors or lines in the chart using a contrast matrix (step 1006). The amount of contrast may be amount of contrast 326, the combination may be respective combination 322, the chart may be chart 314, and the contrast matrix may be contrast matrix 328 in FIG. 3. The process continues by identifying the cost of printing the document using the combinations (step 1008). The cost may be associated respective cost 324 and the combinations may be plurality of combinations 312 in FIG. 3.

Next, the process identifies a number of pairs in each combination having a contrast value above a threshold using the contrast matrix (step 1010). The number of pairs may be minimum number of pairs 340 and the contrast value may be contrast value 330 in FIG. 3. The process then replaces the colors in the document with the combination that has the most number of pairs above the threshold and a cost below a maximum cost (step 1012). The threshold may be threshold value 342 in FIG. 3. The process terminates thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, the process may not identify the number of pairs in the each combination having the contrast value above the threshold using the contrast matrix at step 1010. Instead, the process may identify the combination that has the highest contrast value for a maximum cost of the combination. The cost of the combination is identified in step 1008. The maximum cost is an example implementation of maximum cost 338 in FIG. 3. In such an illustrative embodiment, the process may then replace the colors in the document with the combination that has the highest contrast for a maximum cost of the combination at step 1012.

Additionally, the process may select a subset of the combinations based on a condition prior to performing step 906. For example, the process may select a subset of the combinations that have a cost less than a maximum cost and/or a contrast greater than a minimum amount of contrast. The process may select the subset of combinations to reduce the number of combinations on which step 906 is performed. Thus, step 906 may be performed more quickly on a subset of the combinations than all combinations.

In yet other illustrative embodiments, the process performs a different action responsive to a determination that the amount of contrast for the each combination and the cost for the each combination meet the set of criteria at step 906. In such illustrative embodiments, the process may remove the combination from the data structure containing the combinations. For example, the process may remove the combination from a matrix, table, database, or another suitable data structure.

Thus, the different illustrative embodiments allow a user to reduce the cost of printing a document by replacing the colors in the document with colors that cost less to print. The user is still able to interpret the document with the less costly colors because the less costly colors that are used to print the document have a minimum level of contrast between the colors in the document. The user may be unaware of the cost of printing a document in various colors. The user may also be unconcerned with the cost of printing the documents in various colors. The different illustrative embodiments may be implemented by a party other than the user printing the document. The other party may be responsible for paying the cost of printing documents using the printer.

Thus, the different illustrative embodiments provide a method, computer program product, and apparatus for managing a set of colors in a document. A plurality of respective costs are identified. Each respective cost is associated with printing the document using a respective combination of a plurality of combinations of the set of colors. An amount of contrast for a first respective combination is identified using a contrast matrix. A determination is made as to whether the amount of contrast for the first respective combination and an associated respective cost meet a set of criteria. Responsive to a determination that the set of criteria is met, the document is printed using the first respective combination.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a set of colors in a document, the method comprising:
    identifying a plurality of respective costs, each respective cost associated with printing the document using a respective combination of a plurality of combinations of the set of colors;
    identifying an amount of contrast for a first respective combination using a contrast matrix, wherein the contrast matrix contains a contrast value for pairs of colors in the set of colors, wherein the step of identifying the amount of contrast for the first respective combination using the contrast matrix comprises adding the contrast value for each pair of colors in the first respective combination of the set of colors;
    determining whether the amount of contrast for the first respective combination and an associated respective cost for the first respective combination meet a set of criteria, wherein the set of criteria comprises a minimum number of pairs in the first respective combination having the contrast value greater than a threshold value; and
    responsive to a determination that the set of criteria is met, printing the document using the first respective combination.

2. The method of claim 1, wherein the set of criteria further comprises a minimum amount of contrast for the amount of contrast for the first respective combination.

3. The method of claim 1, wherein the set of criteria further comprises a maximum cost for the associated respective cost of the first respective combination.

4. The method of claim 1, wherein the first respective combination has the amount of contrast that meets the set of criteria, the associated respective cost for the first respective combination that meets the set of criteria, and a lowest cost of the plurality of combinations of the set of colors that meet the set of criteria.

5. The method of claim 1, wherein the document is a chart having a set of lines, wherein each line in the set of lines is to be printed using a color in the set of colors.

6. The method of claim 1, wherein the amount of contrast is an amount of visual difference between colors in the plurality of colors.

7. The method of claim 1, wherein the step of determining whether the amount of contrast for the first respective combination and an associated respective cost for the first respective combination meet a set of criteria comprises:
    determining whether the amount of contrast for each respective combination of the plurality of combinations and the associated respective cost for the first respective combination meet the set of criteria.

8. The method of claim 1, further comprising
    replacing at least one of the set of colors in the document with the first respective combination.

9. A method for managing a set of colors in a document, the method comprising:
    identifying the set of colors in the document that are printable by a printer;
    identifying an amount of contrast for each combination of the set of colors;
    identifying a cost of printing the document using each combination;
    identifying a number of color pairs in each combination having a contrast value above a threshold; and
    replacing the set of colors in the document with an alternative set of colors associated with a given combination of the set of colors that has the largest number of color pairs having a contrast value above a threshold.

10. The method of claim 9, wherein the step of replacing the set of colors in the document comprises:
    replacing the set of colors in the document with an alternative set of colors associated with a given combination of the set of colors that has the largest number of color pairs having a contrast value above a threshold and a cost below a maximum cost.

\* \* \* \* \*